US011205190B1

(12) United States Patent
Lovett et al.

(10) Patent No.: US 11,205,190 B1
(45) Date of Patent: Dec. 21, 2021

(54) SYSTEM FOR PROCESSING A DIGITAL PROMOTION REDEEMABLE AT POTENTIAL REDEMPTION LOCATIONS BASED UPON GEOGRAPHIC LOCATION AND RELATED METHODS (71) Applicant: INMAR CLEARING, INC., Winston-Salem, NC (US)

(72) Inventors: Lee Lovett, Springfield, PA (US); Nathanael Georgeson, Seattle, WA (US); O'Ryan Mcentire, Seattle, WA (US); Samuel May, Kent, WA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 220 days.

(21) Appl. No.: 16/173,248

(22) Filed: Oct. 29, 2018

(51) Int. Cl.
*G06Q 30/02* (2012.01)
*H04W 4/021* (2018.01)
*G01C 21/30* (2006.01)

(52) U.S. Cl.
CPC ......... *G06Q 30/0238* (2013.01); *G01C 21/30* (2013.01); *G06Q 30/0236* (2013.01); *G06Q 30/0239* (2013.01); *H04W 4/021* (2013.01)

(58) Field of Classification Search
CPC .......... G06Q 30/0238; G06Q 30/0239; G06Q 30/0236; H04W 4/021; G01C 21/30
USPC .................................................. 705/14.1, 50
See application file for complete search history.

(56) References Cited

U.S. PATENT DOCUMENTS

| 2005/0039136 | A1* | 2/2005 | Othmer | G06Q 30/02 |
| | | | | 715/774 |
| 2005/0255874 | A1* | 11/2005 | Stewart-Baxter | H04M 1/6075 |
| | | | | 455/550.1 |
| 2006/0089792 | A1* | 4/2006 | Manber | G01C 21/3644 |
| | | | | 701/408 |
| 2007/0174259 | A1* | 7/2007 | Amjadi | G06Q 30/02 |

(Continued)

FOREIGN PATENT DOCUMENTS

WO    WO-2008108772 A1 *  9/2008  ............. G06Q 30/02

OTHER PUBLICATIONS

Debbie Hemley, 26 Tips for Success With Location-Based Marketing, 2012 (Year: 2012).*

*Primary Examiner* — Tarek Elchanti
(74) *Attorney, Agent, or Firm* — Allen, Dyer, Doppelt, + Gilchrist, P.A.

(57) ABSTRACT

A system for processing a digital promotion may include a mobile device associated with a user. The system may also include a digital promotion server configured to cooperate with the mobile device to determine a geographic location. The digital promotion server may determine potential redemption locations based upon the geographic location and cooperate with the mobile device to display thereon the potential redemption locations and cooperate with the mobile device to prompt the user to determine a selected redemption location from among the potential redemption locations. Based upon determining the selected redemption location, the digital promotion server may generate a digital promotion for redemption at the selected redemption location and communicate the digital promotion to the mobile device, and generate a user identifier associated with the user and the digital promotion and communicate the user identifier to the selected redemption location for redemption of the digital promotion.

9 Claims, 5 Drawing Sheets

(56) References Cited

U.S. PATENT DOCUMENTS

| | | | | |
|---|---|---|---|---|
| 2008/0275774 | A1* | 11/2008 | Pepe | G06Q 40/12 |
| | | | | 705/14.69 |
| 2010/0121766 | A1* | 5/2010 | Sugaya | G06Q 30/02 |
| | | | | 705/50 |
| 2010/0331016 | A1 | 12/2010 | Dutton et al. | |
| 2011/0055309 | A1* | 3/2011 | Gibor | G06Q 30/02 |
| | | | | 709/202 |
| 2011/0246284 | A1* | 10/2011 | Chaikin | G06Q 20/105 |
| | | | | 705/14.38 |
| 2011/0282747 | A1* | 11/2011 | Lavrov | G06Q 30/0267 |
| | | | | 705/14.64 |
| 2013/0325494 | A1* | 12/2013 | Angel | G06Q 30/0639 |
| | | | | 705/2 |
| 2014/0372201 | A1* | 12/2014 | Saura | G06Q 30/0273 |
| | | | | 705/14.41 |
| 2015/0095464 | A1* | 4/2015 | Goda | G06F 8/65 |
| | | | | 709/219 |
| 2017/0089718 | A1* | 3/2017 | Bostick | G01C 21/3641 |
| 2018/0152736 | A1* | 5/2018 | Alexander | H04N 21/41407 |
| 2018/0315087 | A1* | 11/2018 | Greenberger | H04W 4/02 |

* cited by examiner

FIG. 4

SYSTEM FOR PROCESSING A DIGITAL PROMOTION REDEEMABLE AT POTENTIAL REDEMPTION LOCATIONS BASED UPON GEOGRAPHIC LOCATION AND RELATED METHODS

TECHNICAL FIELD

The present invention relates to the field of electronics, and more particularly, to geographic location based digital promotion generation and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

SUMMARY

A system for processing a digital promotion may include a mobile wireless communications device associated with a user and a digital promotion server. The digital promotion server may be configured to cooperate with the mobile wireless communications device to determine a geographic location from the mobile wireless communications device, and determine a plurality of potential redemption locations based upon the geographic location and cooperate with the mobile wireless communications device to display thereon the plurality of potential redemption locations. The digital promotion server may also be configured to cooperate with the mobile wireless communications device to prompt the user to determine a selected redemption location from among the plurality of potential redemption locations. Based upon the determined selected redemption location, the digital promotion server may be configured to generate a digital promotion for redemption at the selected redemption location and communicate the digital promotion to the mobile wireless communications device, and generate a user identifier associated with the user and the digital promotion and communicate the user identifier to the selected redemption location for redemption of the digital promotion.

The system may also include a point-of-sale (POS) terminal at the selected redemption location. The digital promotion server may be configured to communicate the user identifier to the POS terminal, for example. The POS terminal may be configured to obtain a user-provided identifier from the user and cooperate with the digital promotion server to redeem the digital promotion based upon a match between the user-provided identifier and the user identifier, for example.

The geographic location from the mobile wireless communications device may include a geographic destination of the user, for example. The geographic location from the mobile wireless communications device may include a current geographic location of the mobile wireless communications device. The mobile wireless communications device may be configured to display the plurality of potential redemption locations on a geographical map.

The digital promotion may be redeemable toward a product/service at the redemption location. The digital promotion may have a redemption value associated therewith equal to a purchase price of the product/service, for example.

A method aspect is directed to method of processing a digital promotion. The method may include using a digital promotion server to cooperate with a mobile wireless communications device associated with a user to determine a geographic location from the mobile wireless communications device. The method may also include using the processor to determine a plurality of potential redemption locations based upon the geographic location and cooperate with the mobile wireless communications device to display thereon the plurality of potential redemption locations. The method may also include using the processor to cooperate with the mobile wireless communications device to prompt the user to determine a selected redemption location from among the plurality of potential redemption locations. Based upon the determined selected redemption location, the method may also include using the processor to generate a digital promotion for redemption at the selected redemption location and communicate the digital promotion to the mobile wireless communications device, and generate a user identifier associated with the user and the digital promotion and communicate the user identifier to the selected redemption location for redemption of the digital promotion.

A computer readable medium aspect is directed to a non-transitory computer readable medium for processing a digital promotion comprising computer executable instructions that when executed by a processor cause the processor to perform operations. The operations may include cooperating with a mobile wireless communications device associated with a user to determine a geographic location from the mobile wireless communications device and determining a plurality of potential redemption locations based upon the geographic location and cooperating with the mobile wireless communications device to display thereon the plurality of potential redemption locations. The operations may also include cooperating with the mobile wireless communications device to prompt the user to determine a selected redemption location from among the plurality of potential redemption locations. The operations may further include, based upon the determined selected redemption location, generating a digital promotion for redemption at the selected redemption location and communicating the digital promotion to the mobile wireless communications device, and generating a user identifier associated with the user and the digital promotion and communicating the user identifier to the selected redemption location for redemption of the digital promotion.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1A:
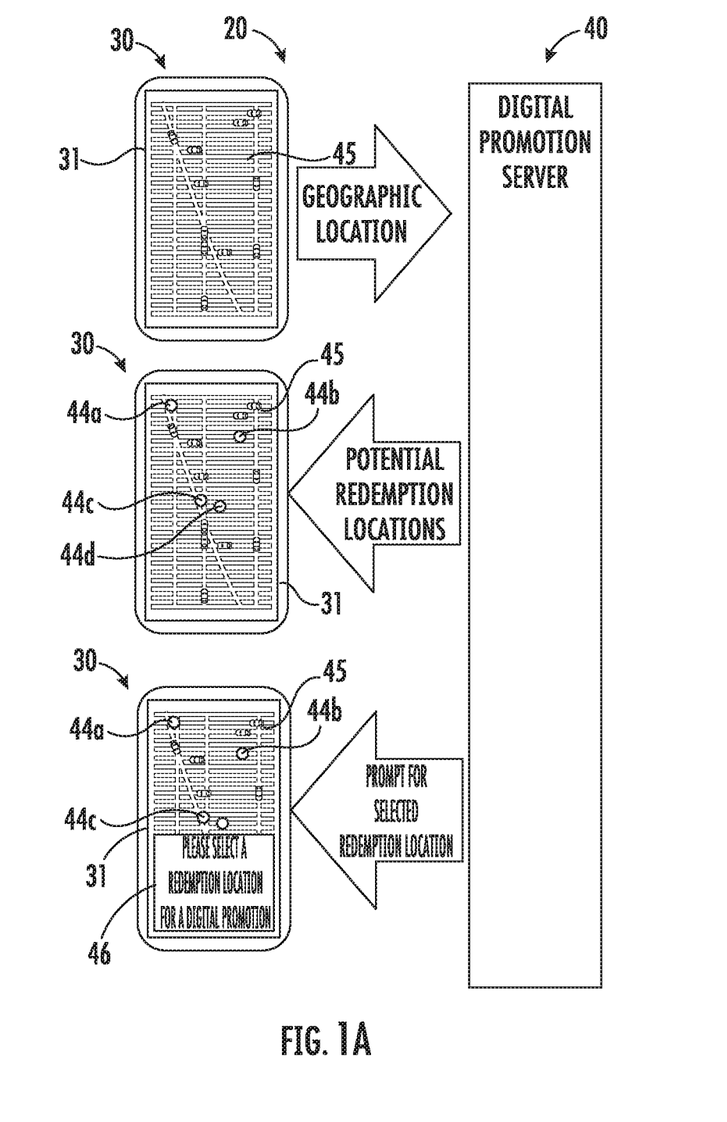
FIG. 1A is a schematic diagram of a portion of a system for processing a digital promotion in accordance with an embodiment.
Figure 1B:
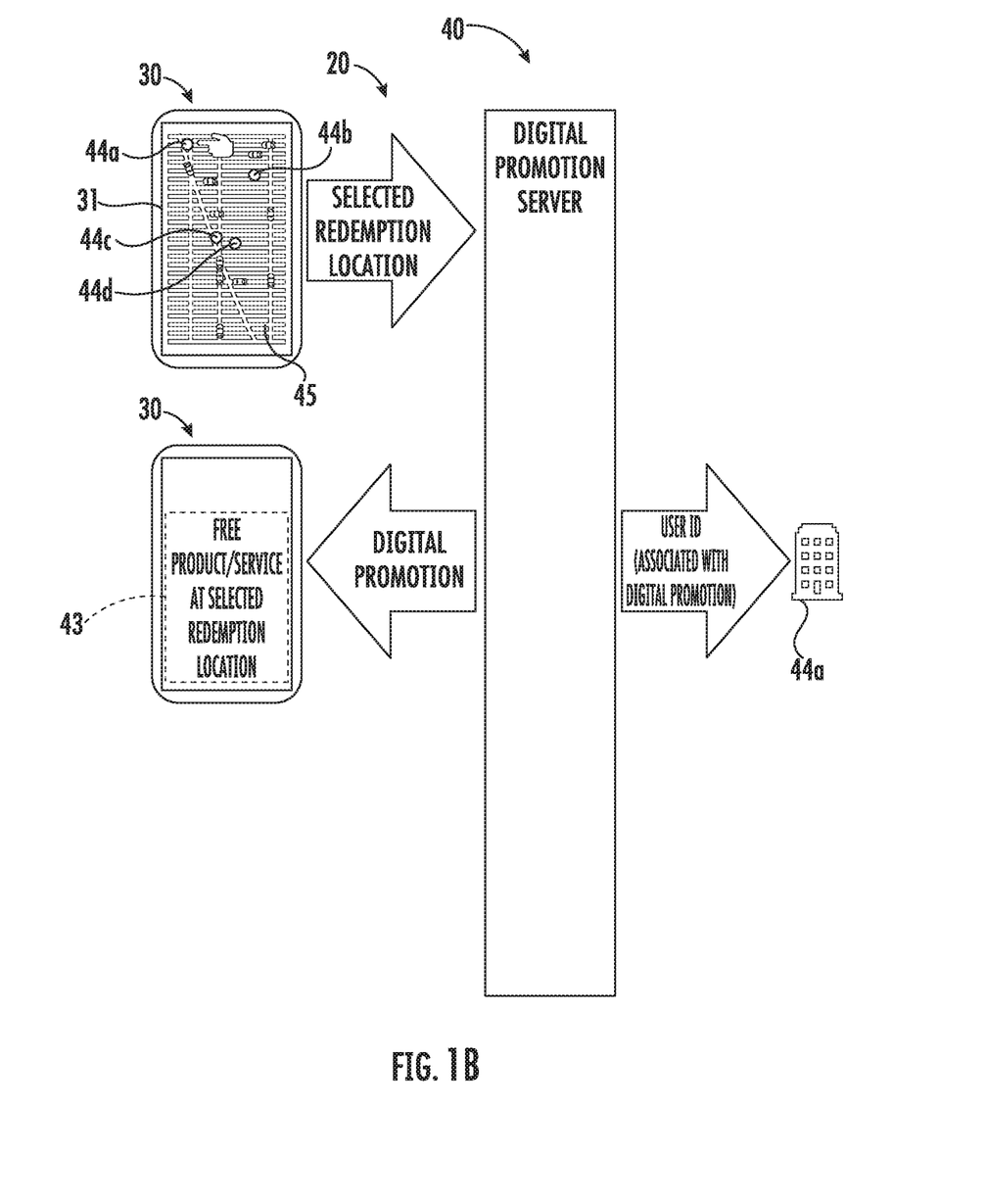
FIG. 1B is another schematic diagram of another portion of a system for processing a digital promotions in accordance with an embodiment.
Figure 2:
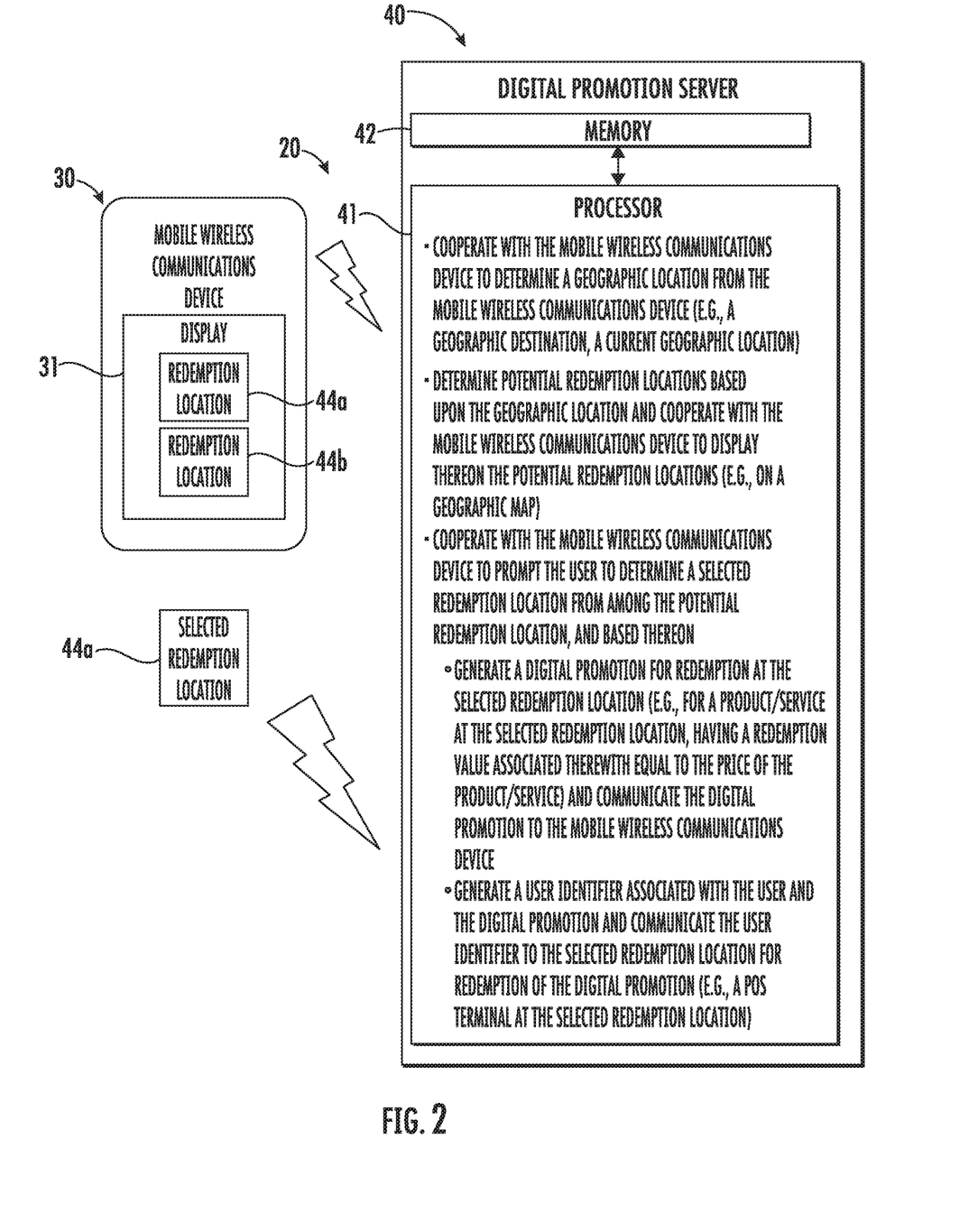
FIG. 2 is a schematic block diagram of a system for processing a digital promotion in accordance with an embodiment.

Referring initially to FIGS. 1-2, a system for processing a digital promotion 20 includes a mobile wireless communications device 30 associated with a user. The mobile wireless communications device 30 is illustratively in the form of a smartphone. While the mobile wireless communications device 30 is in the form of a smartphone, the mobile wireless communications device may be another type of mobile wireless communications device, for example, a tablet computer and/or wearable computer.

The system 20 also includes a digital promotion server 40. The digital promotion server 40 includes a processor 41 and a memory 42 cooperating therewith. The digital promotion server 40 cooperates or communicates with the mobile wireless communications device 30 by way of one or more networks, for example, wireless or cellular networks. While operations of the digital promotion sever 40 are described herein, it should be appreciated that the operations of the digital promotion server are performed through cooperation between the processor 41 and the memory 42.

Figure 3:
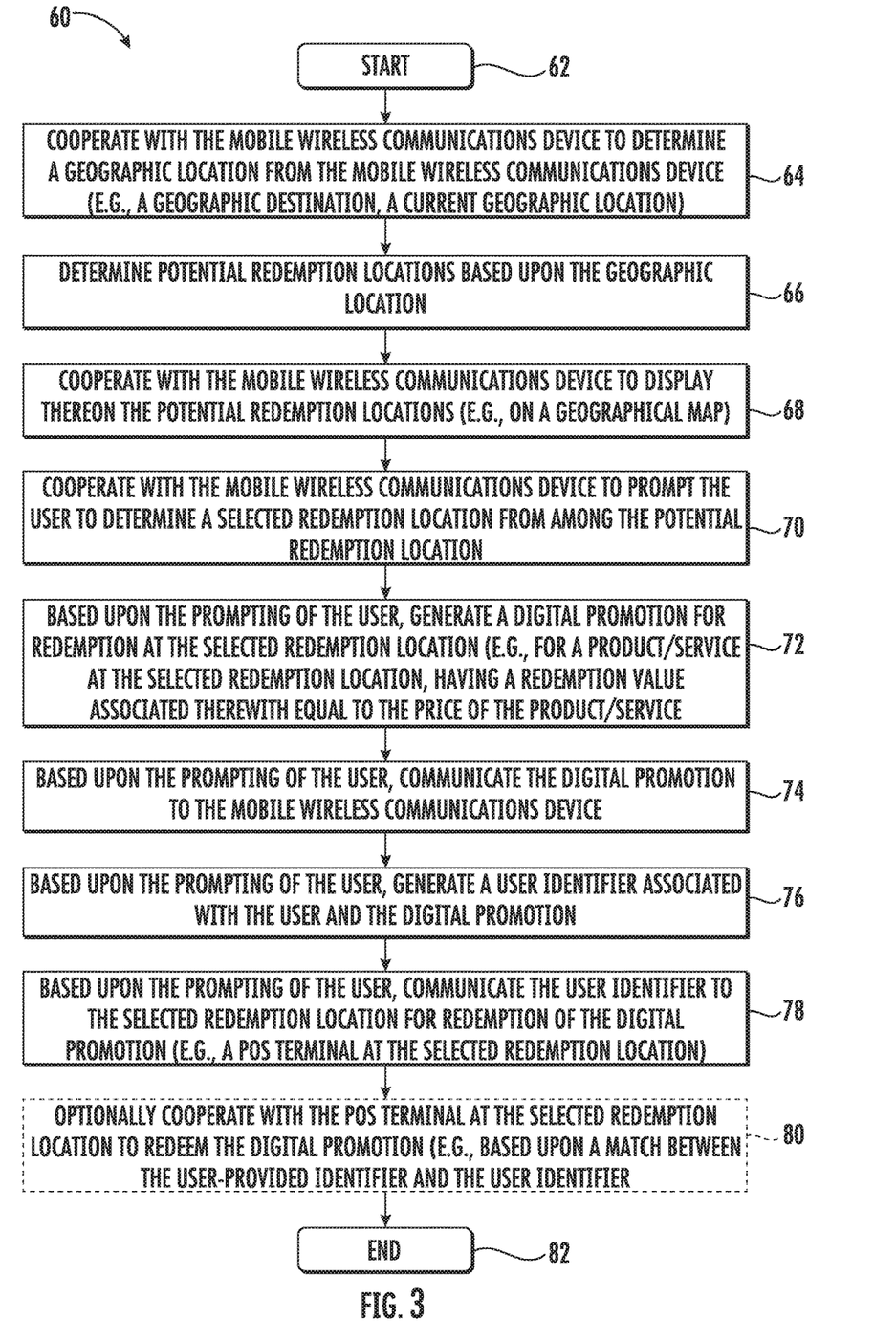
FIG. 3 is a flow diagram illustrating operations of the digital promotion server of FIG. 2.

Referring now to the flowchart 60 in FIG. 3, beginning at Block 62, operation of the digital promotion server 40 will now be described. At Block 64, the digital promotion server 40 cooperates with the mobile wireless communications device 30 to determine a geographic location from the mobile wireless communications device. For example, the mobile wireless communications device 30 may communicate geographical coordinates received from a geographic location determining receiver (e.g., global positioning system) to the digital promotion server 40. Alternatively or additionally, the digital promotion server 40 may determine the geographic location of the mobile wireless communications device 30 based upon one or more communications networks or network addresses. Of course, other techniques may be used to determine the geographic location of the mobile wireless communications device.

The geographic location from the mobile wireless communications device 30 may include a geographic destination of the user. For example, if the user is operating a maps application or ride-sharing application, the geographic location may correspond to the address or geographic area provided to the maps application or a geographic destination provided to the ride-sharing application.

The geographic location may alternatively or additionally include a current geographic location of the mobile wireless communications device 30. The geographic location may be a bar, restaurant, or store (e.g., grocery) that sells products and/or services.

At Block 66, the digital promotion server 40 determines potential redemption locations 44a-44d, for example, for redemption of a digital promotion 43, based upon the geographic location. Potential redemption locations 44a-44d may include retailers, bars, and/or restaurants, for example, that participate in a marketing or advertising campaign. Identification of the potential redemption locations 44a-44d along with associated digital promotion 43 details and geographic locations may be stored in the memory 42.

The digital promotion server 40, at Block 68, cooperates with the mobile wireless communications device 30 to display, for example, on a display 31 of the mobile wireless communications device, the potential redemption locations 44a-44d. The potential redemption locations 44a-44d may be displayed on the mobile wireless communications device 30 in a listed format, for example, ordered by geographical proximity. The potential redemption locations 44a-44d may also be displayed on the mobile wireless communications device 30 on a geographical map 45. In other words, icons representing the different potential redemption locations 44a-44d may be overlaid on a geographical map 45 on the display 31 of the mobile wireless communications device 30. Of course, the potential redemption locations 44a-44n may be displayed on the mobile wireless communications device 30 using or based upon other techniques.

At Block 70, the digital promotion server 40 cooperates with the mobile wireless communications device 30 to prompt the user to determine a selected redemption location 44a from among the potential redemption locations 44a-44d. The prompt may be in the form of a dialog box 46 displayed on the display 31 of the mobile wireless communications device 30, for example, and may prompt for input to, when the display is in the form of a touch display, the touch display, or another input device (e.g., audible, push-button, etc.)

Based upon the prompt or upon selection of the selected redemption location 44a, the digital promotion server 40 generates a digital promotion 43 for redemption at the selected redemption location (Block 72) and communicates the digital promotion to the mobile wireless communications device 30 (Block 74).

The digital promotion 43 may be for a product and/or service available at the selected redemption location 44a. The digital promotion 43 may be in the form of a digital coupon or digital rebate and have a promotional or redemption value associated therewith. The redemption value may be applied toward the purchase price of a product or service at the selected redemption location 44a. In some embodiments, the redemption value may be equal to the entire purchase price of the product or service, and may include taxes and gratuities.

At Block 76, also based upon the prompt or upon selection of the selected redemption location 44a, the digital promotion server 40 generates a user identifier associated with the user and the digital promotion 43 and communicates the user identifier to the selected redemption location 44a for redemption of the digital promotion 43 (Block 78).

Figure 4:
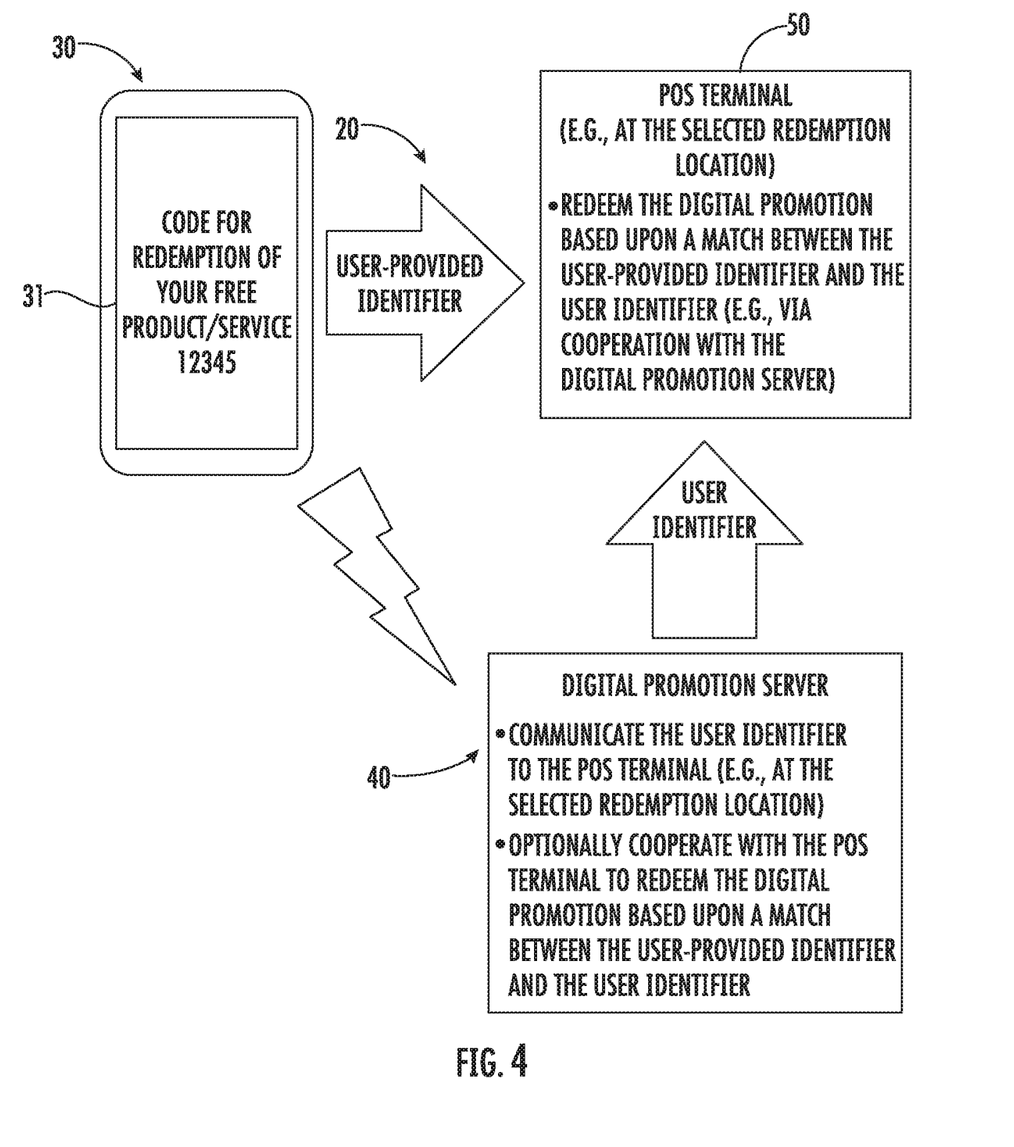
FIG. 4 is another schematic diagram of a system for processing a digital promotion in accordance with an embodiment.

More particularly, referring additionally to FIG. 4 and with respect to redemption, and more particularly, to communicating the user identifier and digital promotion 43 to the selected redemption location 44a, a point-of-sale (POS) terminal 50 may be at the selected redemption location. The digital promotion server 40 may communicate the user identifier to the POS terminal 50 for redemption of the digital promotion 43 (Block 78).

Upon redemption, for example, the POS terminal 50 may obtain a user-provided identifier, for example, a multi-digit code, a passphrase, or other data, that identifies the user. For example, the mobile wireless communications device 30 may wirelessly communicate the user-provided identifier or code to the POS terminal 50. Alternatively, the digital promotion 43 may be saved to a digital wallet on the mobile wireless communications device 30 so that upon redemption, the digital promotion is displayed on the display 31 along with the user-provided identifier (e.g., numerical code, QR code, barcode, etc.). The displayed user-provided identifier may be manually entered at the POS terminal 50 or scanned (e.g., optically) by the POS terminal to complete the redemption (e.g., apply the redemption value to the products/services being purchased).

At Block 80, the digital promotion server 40 may optionally cooperate with the POS terminal 50 to redeem the digital promotion 43, for example, based upon a match between the user-provided identifier and the user identifier. As will be appreciated by those skilled in the art, while redemption may occur at the POS terminal 50, validation of redemption and payment processing from the digital promotion provider or promotion campaign manager may be processed through the digital promotion server 40. In some embodiments, for example, where payment associated with the digital promotion 43 is made from the promotion campaign to the selected redemption location 44a upon communication of the user-identifier to the POS terminal 50, cooperation between the POS terminal and the digital promotion server 40 may not occur. Operations end at Block 82.

A method aspect is directed to method of processing a digital promotion 43. The method includes using a digital promotion server 40 to cooperate with a mobile wireless communications device 30 associated with a user to determine a geographic location from the mobile wireless communications device. The method also includes using the processor 41 to determine a plurality of potential redemption locations 44a-44d based upon the geographic location and cooperate with the mobile wireless communications device 30 to display thereon the plurality of potential redemption locations. The method also includes using the processor 41 to cooperate with the mobile wireless communications device 30 to prompt the user to determine a selected redemption location 44a from among the plurality of potential redemption locations 44a-44d. Based upon the determined selected redemption location 44a, the method also includes using the processor 41 to generate a digital promotion 43 for redemption at the selected redemption location and communicate the digital promotion to the mobile wireless communications device 30, and generate a user identifier associated with the user and the digital promotion and communicate the user identifier to the selected redemption location 44a for redemption of the digital promotion.

A computer readable medium aspect is directed to a non-transitory computer readable medium for processing a digital promotion 43 comprising computer executable instructions that when executed by a processor 41 cause the processor to perform operations. The operations include cooperating with a mobile wireless communications device 30 associated with a user to determine a geographic location from the mobile wireless communications device and determining a plurality of potential redemption locations 44a-44d based upon the geographic location and cooperating with the mobile wireless communications device 30 to display thereon the plurality of potential redemption locations. The operations also include cooperating with the mobile wireless communications device 30 to prompt the user to determine a selected redemption location 44a from among the plurality of potential redemption locations 44a-44d. The operations further include, based upon the determined selected redemption location, generating a digital promotion 43 for redemption at the selected redemption location 44a and communicating the digital promotion 43 to the mobile wireless communications device 30, and generating a user identifier associated with the user and the digital promotion and communicating the user identifier to the selected redemption location for redemption of the digital promotion.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for processing a digital promotion comprising:
   a point-of-sale (POS) terminal at a selected redemption location;
   a mobile wireless communications device associated with a user and configured to manually accept a user-provided alphanumeric code as input thereto; and
   a digital promotion server configured to
      cooperate with the mobile wireless communications device to determine a geographic location from the mobile wireless communications device,
      determine a plurality of potential redemption locations, each having a corresponding redemption geographic location, based upon the geographic location, and cooperate with the mobile wireless communications device to display thereon the plurality of potential redemption locations overlaid on a geographic map at the corresponding redemption geographic locations, and
      cooperate with the mobile wireless communications device to prompt the user to determine the selected redemption location from among the plurality of potential redemption locations, and based thereon
      generate a digital promotion for redemption toward a product or service at the selected redemption location and communicate the digital promotion to the mobile wireless communications device, the digital promotion having a redemption value equal to a purchase price of the product or service, and the digital promotion having a promotion payment source associated therewith,
      obtain the user-provided alphanumeric code directly from the mobile wireless communications device, and
      generate a user identifier based upon the user-provided alphanumeric code, associate the user identifier with the digital promotion, and communicate the user identifier to the POS terminal at the selected redemption location for redemption of the digital promotion;
   said POS terminal configured to, upon redemption of the digital promotion at the selected redemption location
      wirelessly obtain the user-provided alphanumeric code directly from said wireless communications device, and cooperate with the digital promotion server to redeem the digital promotion by, based upon a match between the user-provided alphanumeric code and the user identifier, applying the redemption value to a purchase of the product or service by the user at the selected redemption location;

said digital promotion server, based upon the match between the user-provided alphanumeric code and the user identifier, process payment for the redeemed digital promotion from the promotion payment source to the selected redemption location.

2. The system of claim 1 wherein the geographic location from the mobile wireless communications device comprises a geographic destination of the user.

3. The system of claim 1 wherein the geographic location from the mobile wireless communications device comprises a current geographic location of the mobile wireless communications device.

4. A digital promotion server for processing a digital promotion comprising:
a processor and a memory associated therewith, the processor configured to
cooperate with a mobile wireless communications device associated with a user to determine a geographic location from the mobile wireless communications device,
determine a plurality of potential redemption locations, each having a corresponding redemption geographic location, based upon the geographic location, and cooperate with the mobile wireless communications device to display thereon the plurality of potential redemption locations overlaid on a geographic map at the corresponding redemption geographic locations,
cooperate with the mobile wireless communications device to prompt the user to determine a selected redemption location from among the plurality of potential redemption locations, and based thereon
generate a digital promotion for redemption toward a product or service at the selected redemption location and communicate the digital promotion to the mobile wireless communications device,
obtain a user-provided alphanumeric code directly from the mobile wireless communications device, the user-provided alphanumeric code being manually input by the user to the mobile wireless communications device, the digital promotion having a redemption value equal to a purchase price of the product or service and a promotion payment source associated therewith, and
generate a user identifier based upon the user-provided alphanumeric code, associate the user identifier with the digital promotion, and communicate the user identifier to a point-of-sale (POS) terminal at the selected redemption location for redemption of the digital promotion, and
upon redemption of the digital promotion at the selected redemption location and based upon a match of the user identifier and the user-provided alphanumeric code,
cooperate with the POS terminal to redeem the digital promotion bar applying the redemption value to a purchase of the product or service by the user at the selected redemption location, the user-provided alphanumeric code being wirelessly communicated to the POS terminal directly from the mobile wireless communications device, and process payment for the redeemed digital promotion from the redemption payment source to the selected redemption location.

5. The digital promotion server of claim 4 wherein the geographic location from the mobile wireless communications device comprises a current geographic location of the mobile wireless communications device.

6. A method of processing a digital promotion comprising:
using a digital promotion server to
cooperate with a mobile wireless communications device associated with a user to determine a geographic location from the mobile wireless communications device,
determine a plurality of potential redemption locations, each having a corresponding redemption geographic location, based upon the geographic location, and cooperate with the mobile wireless communications device to display thereon the plurality of potential redemption locations overlaid on a geographic map at the corresponding redemption geographic locations,
cooperate with the mobile wireless communications device to prompt the user to determine a selected redemption location from among the plurality of potential redemption locations, and based thereon
generate a digital promotion for redemption toward a product or service at the selected redemption location and communicate the digital promotion to the mobile wireless communications device, the digital promotion having a redemption value equal to a purchase price of the product or service, and the digital promotion having a promotion payment source associated therewith,
obtain a user-provided alphanumeric code directly from the mobile wireless communications device, the user-provided alphanumeric code being manually input by the user to the mobile wireless communications device, and
generate a user identifier based upon the user-provided alphanumeric code, associate the user identifier with the digital promotion, and communicate the user identifier to a point-of-sale (POS) terminal at the selected redemption location for redemption of the digital promotion, and
upon redemption of the digital promotion at the selected redemption location and based upon a match of the user identifier and the user-provided alphanumeric code,
cooperate with the POS terminal to redeem the digital promotion bar applying the redemption value to a purchase of the product or service by the user at the selected redemption location, the user-provided alphanumeric code being wirelessly communicated to the POS terminal directly from the mobile wireless communications device, and
process payment for the redeemed digital promotion from the redemption payment source to the selected redemption location.

7. The method of claim 6 wherein the geographic location from the mobile wireless communications device comprises a current geographic location of the mobile wireless communications device.

8. A non-transitory computer readable medium for processing a digital promotion comprising computer executable instructions that when executed by a processor cause the processor to perform operations comprising:

cooperating with a mobile wireless communications device associated with a user to determine a geographic location from the mobile wireless communications device;

determining a plurality of potential redemption locations, each having a corresponding redemption geographic location, based upon the geographic location and cooperating with the mobile wireless communications device to display thereon the plurality of potential redemption locations overlaid on a geographic map at the corresponding redemption geographic locations;

cooperating with the mobile wireless communications device to prompt the user to determine a selected redemption location from among the plurality of potential redemption locations, and based thereon generating a digital promotion for redemption toward a product or service at the selected redemption location and communicating the digital promotion to the mobile wireless communications device, the digital promotion having a redemption value equal to a purchase price of the product or service, and the digital promotion having a promotion payment source associated therewith, obtaining a user-provided alphanumeric code directly from the mobile wireless communications device, the user-provided alphanumeric code being input by the user to the mobile wireless communications device, and generating a user identifier based upon the user-provided alphanumeric code, associating the user identifier with the digital promotion, and communicating the user identifier to a point-of-sale (POS) terminal at the selected redemption location for redemption of the digital promotion; and upon redemption of the digital promotion at the selected redemption location and based upon a match of the user identifier and the user-provided alphanumeric code, cooperating with the POS terminal to redeem the digital promotion by applying the redemption value to a purchase of the product or service by the user at the selected redemption location, the user-provided alphanumeric code being wirelessly obtained by the POS terminal directly from the mobile wireless communications device, and processing payment for the redeemed digital promotion from the redemption payment source to the selected redemption location.

9. The non-transitory computer readable medium of claim 8 wherein the geographic location from the mobile wireless communications device comprises a current geographic location of the mobile wireless communications device.

* * * * *

UNITED STATES PATENT AND TRADEMARK OFFICE
CERTIFICATE OF CORRECTION

| | | |
|---|---|---|
| PATENT NO. | : 11,205,190 B1 | Page 1 of 1 |
| APPLICATION NO. | : 16/173248 | |
| DATED | : December 21, 2021 | |
| INVENTOR(S) | : Lovett et al. | |

It is certified that error appears in the above-identified patent and that said Letters Patent is hereby corrected as shown below:

In the Claims

Column 7, Line 62     Delete: "bar"
Insert: --by--

Column 8, Line 51     Delete: "bar"
Insert: --by--

Signed and Sealed this
Thirty-first Day of May, 2022

Katherine Kelly Vidal
*Director of the United States Patent and Trademark Office*